(No Model.)
J. WALLACE & H. H. MERGAN.
THILL FOR VEHICLES.
No. 549,863.  Patented Nov. 12, 1895.
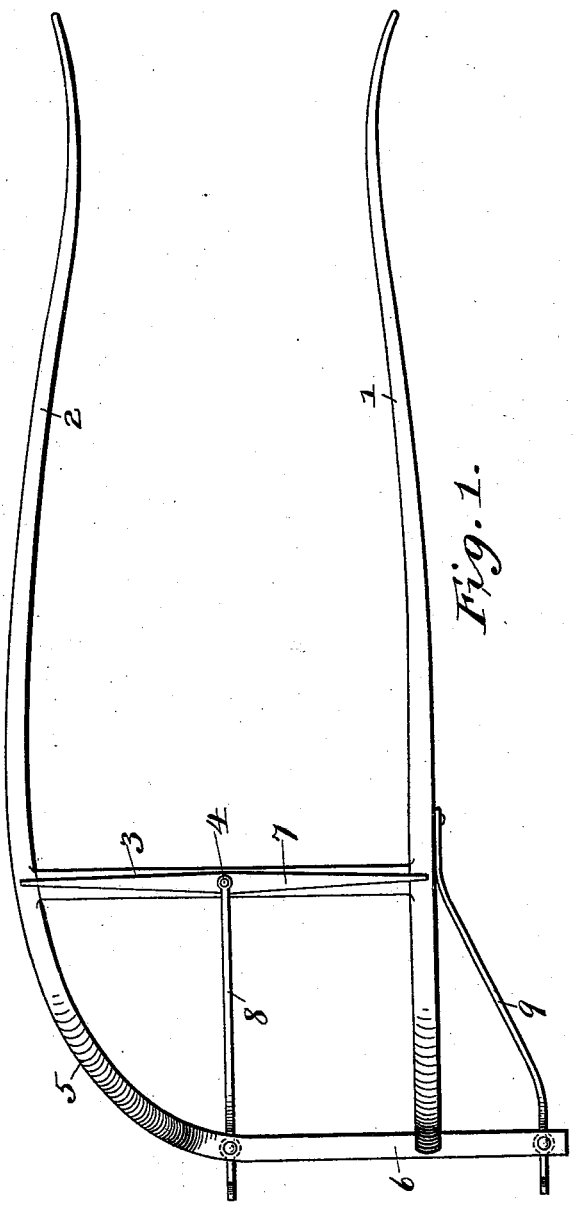
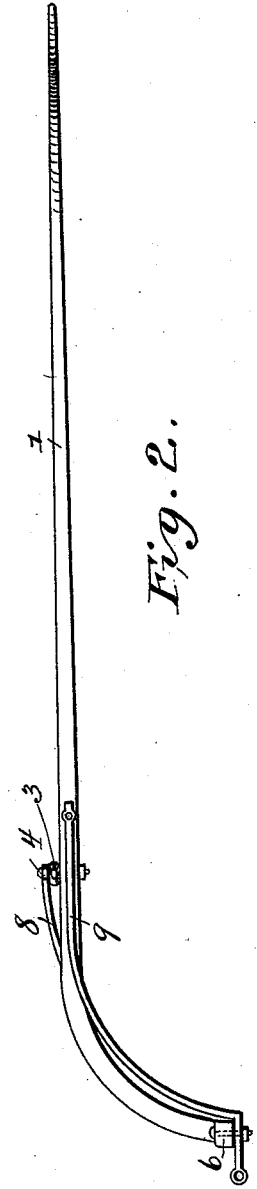
Witnesses:
Jas. H. Blackwood
Harry W. Wallis.
Inventors,
John Wallace
and Henry H. Mergan
by David A. Gourick
Attorney.

UNITED STATES PATENT OFFICE.

JOHN WALLACE, OF HOUGHTON, AND HENRY HARRY MERGAN, OF JACOBSVILLE, MICHIGAN.

THILL FOR VEHICLES.

SPECIFICATION forming part of Letters Patent No. 549,863, dated November 12, 1895.

Application filed May 11, 1895. Serial No. 548,987. (No model.)

*To all whom it may concern:*

Be it known that we, JOHN WALLACE, residing at Houghton, and HENRY HARRY MERGAN, residing at Jacobsville, in the county of Houghton, State of Michigan, citizens of the United States, have invented certain new and useful Improvements in Thills for Vehicles, of which the following is a specification.

Our invention relates to shafts or thills for vehicles, and more particularly to that class of vehicles known as "cutters," and its object is to provide an improved construction of shafts that will enable the driver to see directly ahead, thereby reducing to a minimum the danger of collision with a vehicle coming from an opposite direction.

A further object of our invention is to do away with the sharp projecting corner of the shafts heretofore constructed in this manner, so that even should the same come in contact with the shafts of a vehicle passing in an opposite direction they will ride over the other shafts without danger of breaking the shafts of either vehicle or of overturning either vehicle. Moreover, when the snow is deep and banked up on the sides of the road, the curved shaft will more easily ride over the same.

These objects we accomplish in the manner and by the means hereinafter described and claimed, reference being had to the drawings accompanying this specification, in which—

Figure 1 is a top plan view of our improved shafts, and Fig. 2 is a side elevation of the same.

In the said drawings, the numeral 1 denotes the off or right-hand thill, and 2 the near or left-hand thill. These thills are constructed in the manner shown, the left thill projecting backward in substantially the usual manner until it passes the point of connection with the cross-bar 3, and bending from thence inward and downward to a point directly to the rear of the whiffletree-bolt 4, thus forming the curved portion 5. From thence it continues into the extension 6, parallel with the cross-bar 3, and receiving intermediate its length the rear end of the near shaft 1, connected thereto in any suitable manner.

The usual whiffletree 7 is pivoted centrally on the cross-bar 3, and the bolt 4 connecting the two also passes through an eye in the front end of one of the shaft-irons 8, which projects from thence downwardly and rearwardly, passing under the extension 6 of the thill 2 and bolted thereto. The other shaft-iron 9 is attached at its front end to the side of the thill 1, and also projects from thence rearwardly, downwardly, and outwardly, also passing under the extreme outer end of the extension 6 and bolted thereto. These shaft-irons are provided at their rear ends with suitable means for connecting them to the running-gear of the vehicle.

From the above description it will be readily seen that the driver sitting on the right side of the vehicle will have an unobstructed view in front, while the shafts will afford no obstruction to the passage of a vehicle on the other side. Moreover, the construction and combination of the several parts afford an extremely simple and strong device, the draft-strain being carried by the off thill 1 and the cross-bar 3 and not by the curved thill 2.

Having thus described our invention, what we claim as new, and desire to secure by Letters Patent, is—

In thills for vehicles, the combination of the cross bar 3; the off thill 1, having its rear end bent downwardly from the point of its contact with the cross bar 3, and secured to the rear part of the near thill intermediate of the extreme end of the near thill and the rear portion of the shaft iron 8; said shaft iron 8 secured to said cross bar 3 by the whiffletree bolt 4 and curved downwardly to the point of contact with the rear part of the near thill 2 and then run directly backward for attachment to the running gear of the vehicle;

the said near thill 2, curving downwardly and inwardly from its point of contact with said cross bar 3 to the point of contact with said shaft iron 8, and then horizontally at a right angle therewith beyond the rear end of the thill 1 to and forming a support for the shaft iron 9; said shaft iron 9 attached at its front end to thill 1 and curved downwardly and outwardly to the point of contact with said thill 2, near its extreme rear end, and thence directly rearward for attachment to the running gear of the vehicle, substantially as shown and described.

JOHN WALLACE.
HENRY HARRY MERGAN.

Witnesses:
 PETER $\overset{\text{his}}{\times}$ DESTROM,
 $\phantom{\text{PETER}}\overset{}{\text{mark}}$
 JOHN J. MEYER,
 JAMES K. POLK.